INVENTORS.
Gebhard Jaeger.
Chris Gerst.

Nov. 21, 1939. G. JAEGER ET AL 2,180,470
TRANSMISSION
Filed Nov. 15, 1937 5 Sheets-Sheet 3

INVENTORS
Gebhard Jaeger.
Chris Gerst.
BY
ATTORNEYS.

INVENTORS.
Gebhard Jaeger.
Chris Gerst.
BY
ATTORNEYS.

Nov. 21, 1939.  G. JAEGER ET AL  2,180,470

TRANSMISSION

Filed Nov. 15, 1937  5 Sheets-Sheet 5

INVENTORS.
Gebhard Jaeger.
Chris Gerst.
BY
ATTORNEYS.

Patented Nov. 21, 1939

2,180,470

UNITED STATES PATENT OFFICE 2,180,470

TRANSMISSION

Gebhard Jaeger, Columbus, Ohio, and Chris Gerst, Detroit, Mich.

Application November 15, 1937, Serial No. 174,602

10 Claims. (Cl. 192—4)

Our invention relates to a transmission. It has to do, more particularly, with a transmission which is particularly useful when incorporated in the drive between a power unit and the mixing drum of a concrete mixer, such as a truck mixer, although it is not limited in its application to mixers. Our transmission is suitable for use in any drive between a power unit and a member to be driven.

It is customary to have on truck mixers a power unit for driving the drum of the mixer. A transmission is usually incorporated in the drive between the power unit and the mixing drum. It is desirable to provide a multi-speed transmission so that the drum may be driven at different rates of speed. It is necessary to have a brake associated with the transmission which will serve to prevent rotation of the mixing drum when the drive between the power unit and the drum is disconnected. This brake serves to prevent rotation of the drum during the charging operation or at other selected periods. It is absolutely essential that the brake be effective to prevent rotation of the drum each time that the drive between the power unit and the drum is interrupted in order to prevent injury to workmen during loading, et cetera. Furthermore, it is desirable for the brake to be so arranged that it will produce the most effective braking action possible on the drum, inasmuch as the drum and contents are very heavy and during loading there is a tendency for the drum to rotate. Since a multi-speed transmission is employed it is desirable that it be of such a type that it can be set at a certain speed and the drive between the power unit and the drum can be connected or disconnected and the rotation of the drum can be reversed without shifting gears.

With a transmission of this type a clutch is usually provided between the power unit and the in-put shaft of the transmission. Also, means is provided so that the transmission may be selectively actuated to drive the mixing drum in either direction. It is desirable to have a single control lever for actuating the power unit clutch, the means for selectively rotating the drum in either direction, and the brake for preventing rotation of the drum. Furthermore, it is desirable that the control means for performing these various functions be of a simple structure and be of such a type that it will not bind even when encountering the unfavorable conditions when it is associated with a mixer and which are caused by water, sand, et cetera.

It is necessary for a transmission of this type to be simple and compact in structure in order that it can be mounted in the limited space usually available. Also, it is desirable that it be of very rugged construction so that it will hold up under the hard usage to which transmissions of this type are usually subjected. Furthermore, it is very essential that the location of the multi-speed transmission is such as to permit speed selection and shifting without difficulty, and yet not interfere with the braking action.

One of the objects of our invention is to provide a transmission of the type indicated which is of a very simple and compact structure and which is of very rugged construction.

Another object of our invention is to provide a transmission of the type indicated which has a brake associated with it and so arranged that each time the drive between the in-put shaft and the out-put shaft of the transmission is interrupted, the brake will automatically be effective to prevent rotation of the out-put shaft.

Another object of our invention is to provide a transmission of the type indicated having a brake associated therewith, the brake being so arranged that maximum braking action will be obtained.

Another object of our invention is to provide a transmission of the type indicated having a clutch between the power unit and the in-put shaft of the transmission, having means for selectively driving the out-put shaft in either direction, and having a brake for preventing rotation of the out-put shaft, all of said members being under the control of a single control lever.

Another object of our invention is to provide a transmission of the type indicated in the preceding paragraph wherein the controlling means for the various members is of such a nature that movement of the single control lever in one direction from a neutral position will release the brake, actuate the means for selectively driving the out-put shaft in either direction to drive it in one direction, and engage the power unit clutch while movement of the control lever in the opposite direction from neutral position will release the brake, actuate said means to drive the out-put shaft in a reverse direction and engage the power unit clutch.

Another object of our invention is to provide controlling means for performing the various functions indicated in the preceding paragraph, said controlling means being very simple and composed of a small number of parts, being free of excessive friction to insure ease of operation and being of such a nature that the parts will not bind.

Another object of our invention is to provide a transmission with the multi-speed means so arranged as to permit selection and shifting of gears without any difficulty.

Another object of our invention is to provide a transmission of the type indicated which is of such a nature that it may be set at a certain speed and the drive between the in-put shaft and the out-put shaft may be connected or disconnected without shifting gears and the rotation of the out-put shaft may be reversed without shifting gears.

In its preferred form our invention contemplates the provision of a transmission which is disposed between a power unit such as an internal combustion engine and a member to be driven such as a mixing drum. The in-put shaft of the transmission is connected to the drive shaft of the engine and a clutch is provided between the drive shaft of the engine and the in-put shaft of the transmission for selectively connecting or disconnecting these members. The out-put shaft of the transmission is suitably connected to the mixing drum so as to drive said drum. A multi-speed gear unit is associated with the transmission between the in-put shaft and the out-put shaft thereof. Means is disposed between the in-put shaft and the out-put shaft for connecting or disconnecting the shafts. This means includes a pair of gear clutches one of which may be operated to connect the in-put shaft to the out-put shaft for driving it in one direction and the other of which may be operated to connect the in-put shaft to the out-put shaft in such a manner as to drive it in a reverse direction. If both clutches are rendered inoperative, the out-put shaft will be entirely disconnected from the in-put shaft. The multi-speed gear unit for driving the out-put shaft at different speeds and the unit embodying the gear clutches for selectively connecting or disconnecting the out-put shaft and the in-put shaft or for selectively rotating the out-put shaft in either direction may be actuated independently of each other. A brake unit is associated with the transmission and is adapted to prevent rotation of the out-put shaft whenever the drive between the in-put shaft and the out-put shaft is interrupted. In order to obtain maximum braking action, the brake unit is not mounted directly on the out-put shaft but is mounted on a shaft independent of the out-put shaft. However, the brake shaft is connected continuously to the out-put shaft by gears which are so arranged as to increase the torque applied by the brake to the out-put shaft and, thereby, to increase the effectiveness of the brake.

One of the important features of our invention is the controlling means which we provide for the transmission. This controlling means is of such a nature that by merely operating a single control lever, the brake, the forward and reverse clutches for the out-put shaft and the engine clutch will all be operated. When the control lever is in neutral position, the brake will be on, the forward and reverse clutches will both be out of engagement so as to interrupt the drive between the in-put shaft and the out-put shaft, and the engine clutch will be out of engagement to interrupt the drive between the drive shaft of the engine and the in-put shaft of the transmission. Moving the control lever in one direction from neutral will cause the brake to be released, one of the gear clutches to be engaged to drive the out-put shaft in one direction and the engine clutch to be engaged to connect the engine shaft to the in-put shaft of the transmission. On the other hand, movement of the control lever in the opposite direction from neutral position will cause the brake to be released, the other gear clutch to be engaged to drive the out-put shaft in the reverse direction and the engine clutch to be engaged to connect the engine shaft to the in-put shaft of the transmission. Thus, it is necessary for an operator merely to move a single control lever in one direction to operate the various units to cause the mixing drum to be driven in one direction and to move the control lever back to neutral position to stop the drum. Movement of the control lever away from neutral position in the opposite direction will cause rotation of the drum in a reverse direction while movement back to neutral position again will stop rotation of the drum.

The controlling means connected to the main control lever for operating the various units is of a very simple and effective structure. Most of the parts thereof are rotating parts in order to reduce friction to a minimum. Furthermore, the controlling means is of such a nature that it will not bind. It will be apparent that the brake is always applied whenever the main control lever is in neutral position. Thus, whenever the drive between the power unit and the out-put shaft is interrupted and rotation of the drum is stopped, the brake is always automatically applied in order to prevent accidental rotation of the drum.

This application is a continuation in part of our co-pending application on Transmission, Serial No. 152,934, filed July 10, 1937.

The preferred embodiment of our invention is illustrated in the accompanying drawings wherein similar characters of reference designate corresponding parts and wherein.

Figure 1:
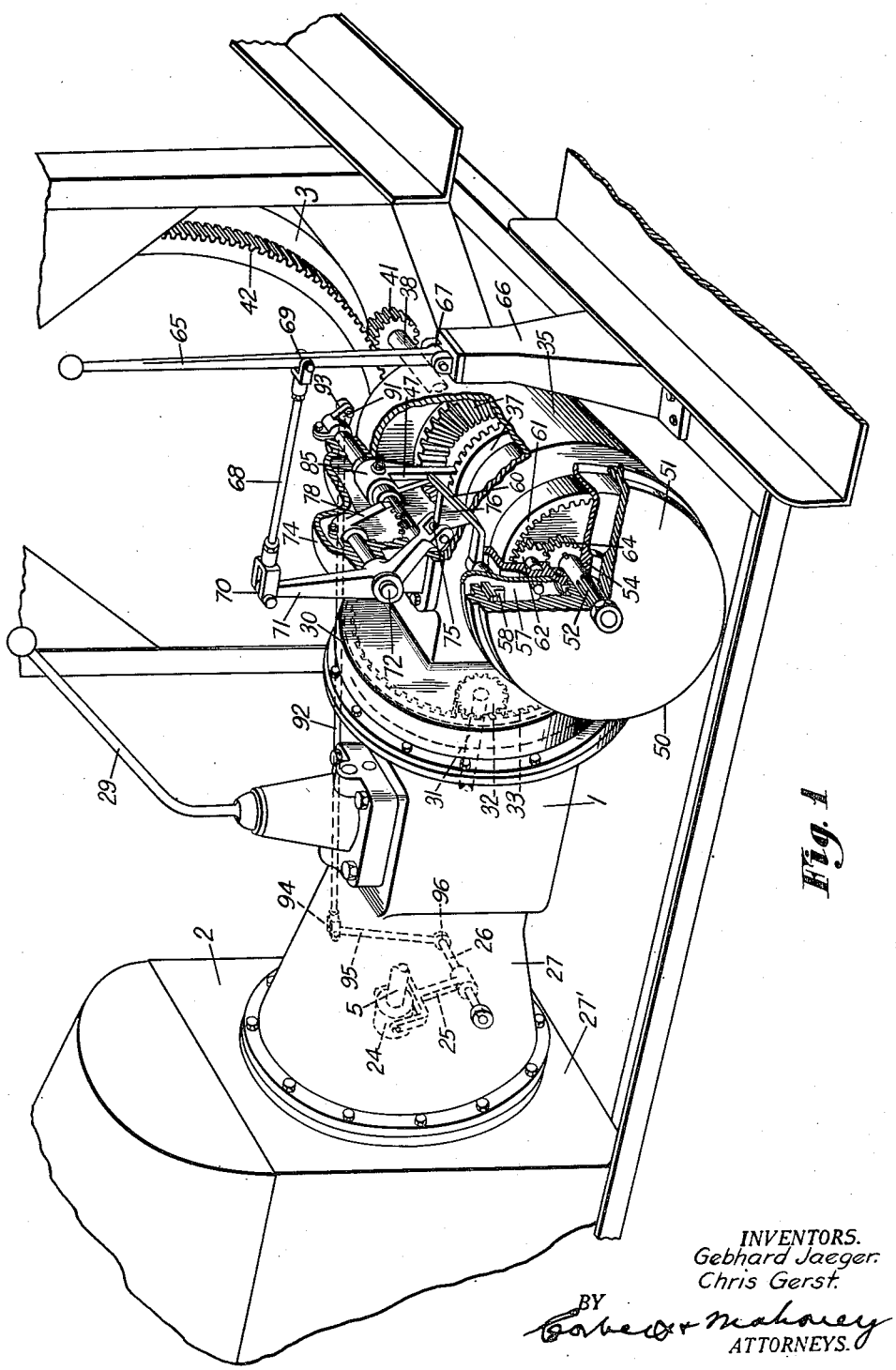
Figure 1 is a perspective view, partly broken away, illustrating our transmission assembly disposed between a power unit and means for rotating a mixing drum.

With reference to the drawings and particularly to Figure 1, we have illustrated a transmission 1, constructed in accordance with our invention, disposed between a power unit 2 which may be an internal combustion engine and a mixing drum illustrated diagrammatically at 3. The transmission 1 in this instance connects the power unit to the means for driving the mixing drum although it is to be understood that it is not limited to this use.

The drive shaft 4 of the engine is adapted to be selectively connected or disconnected to the in-put shaft 5 of the transmission by a clutch indicated generally by the numeral 6. This clutch is associated with a fly wheel 7 which is keyed on the end of the shaft 4. The shaft 5 has its end mounted on ball bearings 8 carried by the fly wheel 7. The fly wheel 7 has a peripheral flange 9 and an inwardly projecting annular plate 10 is bolted to the edge of this flange as at 11. This plate 10 serves as a friction plate for the clutch. A clutch disk 12 is mounted within the fly wheel 7 and is keyed on the shaft 5 in such a manner that slight movement longitudinally of the shaft is permitted. This disk 12 has a hub 13 formed thereon. This hub carries a clutch disk 14 which is disposed on the opposite side of plate 10. The clutch disk 14 is splined on the hub 13 so that it will rotate therewith but can move longitudinally thereof. The clutch disk 14 is adapted to be forced towards the disk 12 in order to grip the plate 10 therebetween and, consequently, to connect shaft 4 to shaft 5.

The means for moving the disk 14 comprises what might be termed a toggle joint. This toggle joint comprises a member 15 pivoted at 16 to a collar 17 threaded on the hub 13. This member 15 has a surface 18 adapted to engage a boss 19 formed on the disk 14. The outer end of member 15 is connected by a pin-and-slot connection 20 to a member 21 having its lower end pivotally connected at 22 to a collar 23 which is splined to the shaft 5. Movement of the collar 23 towards disk 14 will cause the member 21 to force the outer end of member 15 upwardly causing the surface 18 thereof to strike the boss 19 and to force the disk 14 towards the plate 10. Limited movement of the collar 23 on the shaft 5 is permitted before the clutch is engaged, due to the pin-and-slot connection 20. Longitudinal movement of the collar 23 on the shaft 5 is produced by means of a second collar 24 which is connected to the collar 23 in such a manner that the collar 23 may rotate relative to the collar 24 but longitudinal movement of the collar 24 will correspondingly move collar 23. The collar 24 is adapted to be moved longitudinally by means of a yoke 25 having its lower end keyed to a rotatable shaft 26 which is suitably carried by bearings secured to a housing 27. Rotation of the shaft 26 is controlled by means which will be described later. Thus, clutch means is provided for selectively connecting or disconnecting the shafts 4 and 5.

The shaft 5 passes through the housing 27 which is bolted to the engine housing 27' and projects therefrom. The shaft 5 projects into a multi-speed gear unit 28 which is disposed within a housing connected to housing 27. This multi-gear unit 28 may be of any suitable type but is preferably of a type similar to that disclosed in our co-pending application S. N. 107,556 so that it may be actuated to obtain two different speeds or may be shifted into neutral. A gear shift lever 29 projects from the upper end of the housing in which the multi-speed gear unit is disposed and this lever is adapted to be employed in shifting the gears.

A housing 30 is bolted to the housing of the unit 28. A shaft 31 leads from the multi-speed unit 28. This shaft 31 has a pinion 32 keyed on its end which meshes with a large internal gear 33 disposed within the housing 30. This gear 33 is carried by a shaft 34. This shaft 34 projects into a housing 35 connected to the housing 30. The outer end of the shaft 34 carries a large bevel gear 36. This bevel gear 36 is always in mesh with a pair of rotatable ring gears 37 which face towards each other and are disposed on opposite sides of the gear 36. These gears 37 are disposed within the housing 35.

Figures 3, 4:
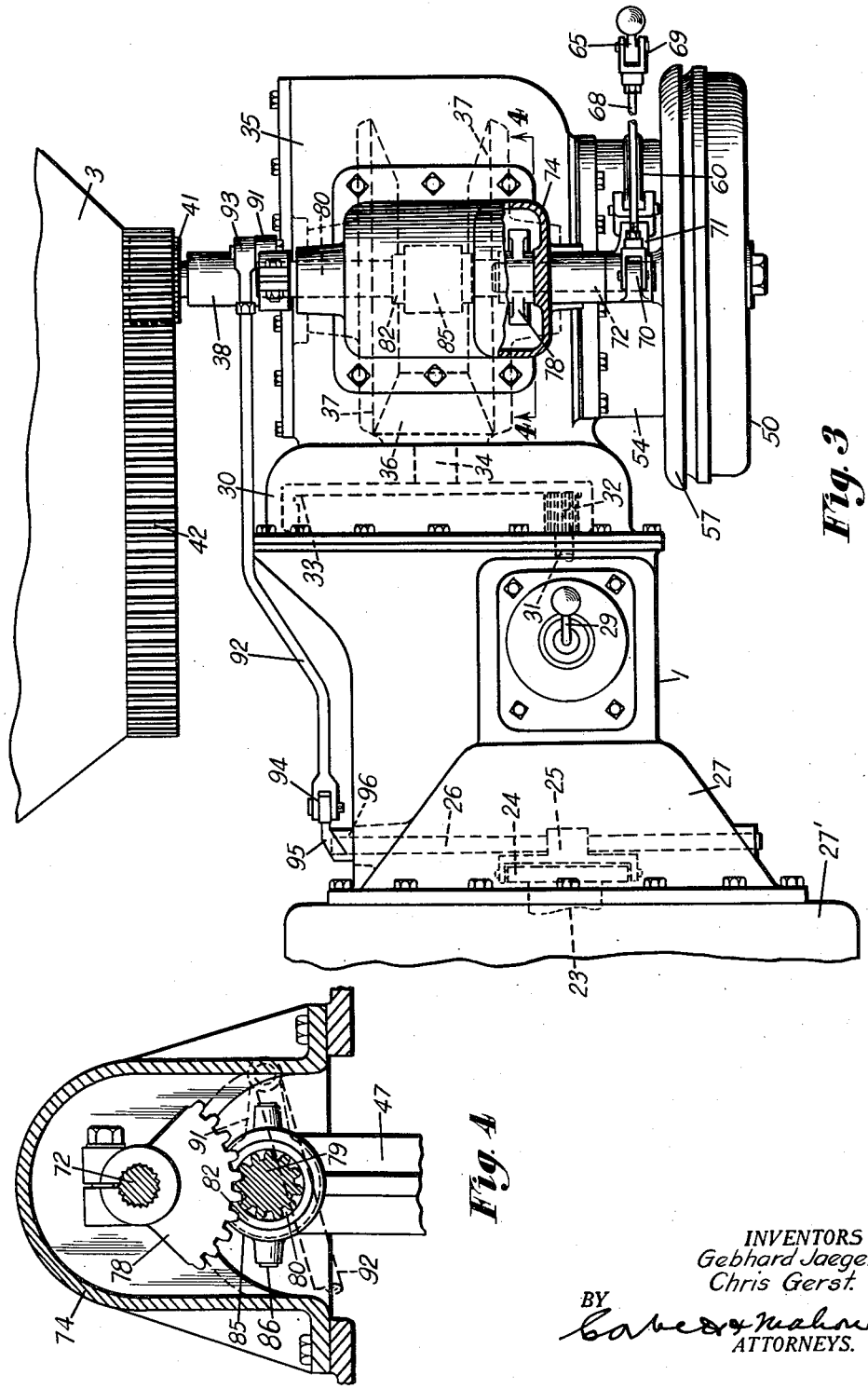
Figure 3 is a plan view of the structure shown in Figure 1.
Figure 4 is a section taken substantially along line 4—4 of Figure 3.
Figure 5:
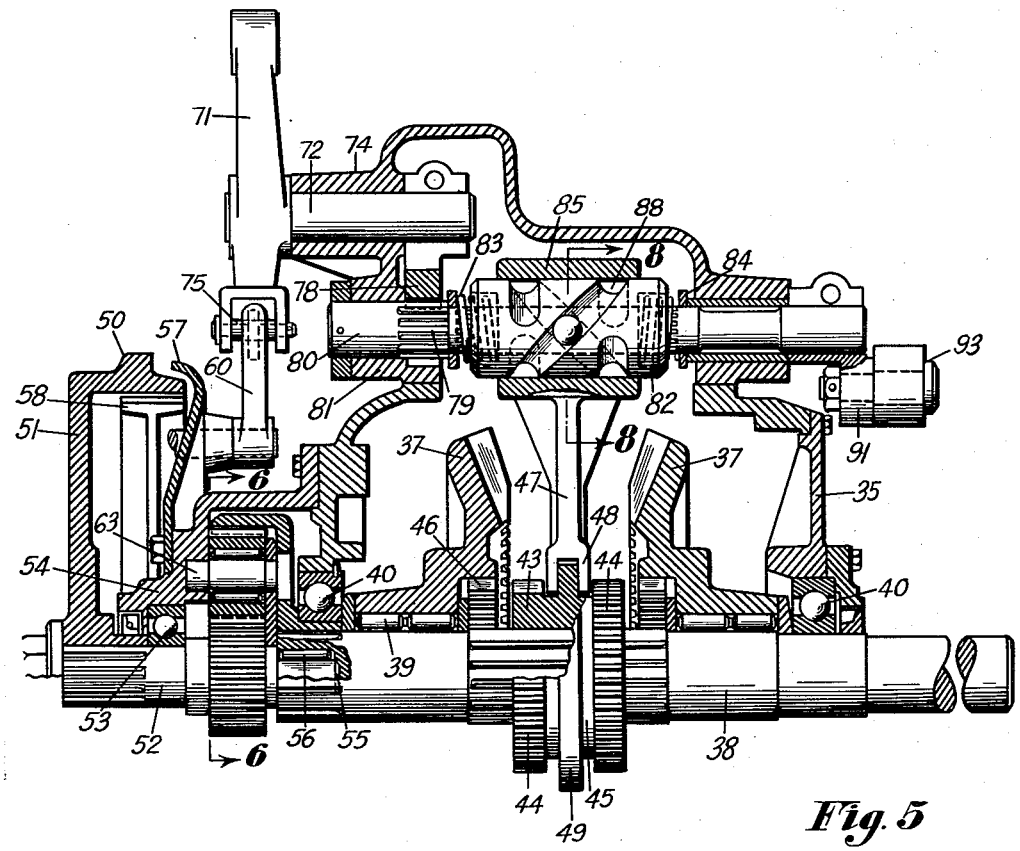
Figure 5 is a vertical section taken through a portion of the transmission.

As indicated best in Figure 5, each ring gear 37 is rotatably mounted on the out-put shaft 38 of the transmission which extends through the housing 35 and is disposed substantially at right angles to the shaft 34. Each ring gear is rotatably mounted on the shaft 38 by means of roller bearings 39. The shaft 38 is rotatably carried in ball bearing 40 disposed in the front and rear walls of the housing 35. The shaft 38 projects through the rear wall of the housing and has a pinion 41 (Figures 1 and 3) keyed on its rear end. This pinion 41 meshes with a large ring gear 42 which is carried by the mixing drum. Thus, the out-put shaft of the transmission drives the mixing drum.

Means is provided for selectively coupling the ring gears 37 to the shaft 38. This means is of such a nature that one of the ring gears may be connected to the shaft to cause driving thereof in one direction or the other gear may be connected to the shaft to cause driving thereof in the opposite direction or both gears may be disconnected therefrom to prevent driving of the shaft in either direction. For this purpose we provide what may be termed a pair of gear clutches which are indicated generally by the numerals 43. Each gear clutch comprises an external gear portion 44 carried on the end of a collar member 45 which is splined on the shaft 38 and is disposed between the two ring gears 37. Each ring gear 37 is also provided with an internal gear portion 46 which is adapted to co-operate with the gear portion 44 disposed on the adjacent end of member 45. It will be apparent that the member 45 may be moved longitudinally of shaft 38 to move either of the gear portions 44 within the internal gear portion 46 disposed adjacent thereto. This will clutch the gear 37 to the shaft 38 so that the shaft will be driven by the gear 37. Thus, by moving member 45 longitudinally of shaft 38, one of the gears 37 may be clutched to the shaft 38 to drive it in one direction or if the member 45 is moved in the opposite direction the other gear 37 will be clutched to the shaft 38 and will drive the shaft in a reverse direction. With the collar member 45 in the position indicated in Figure 5, both clutches are in neutral and neither of the ring gears 37 is connected to the shaft 38. A shifting fork member 47 is provided for moving the collar 45 longitudinally of shaft 38 in either direction. This fork has a bifurcated lower end 48 which engages an outwardly projecting flange 49 on the member 45. Thus, the member 45 may rotate freely relative to the fork 47. The means for moving the fork 47 to cause movement of the collar 45 and consequent operation of clutches 43 will be described subsequently.

Figure 2:
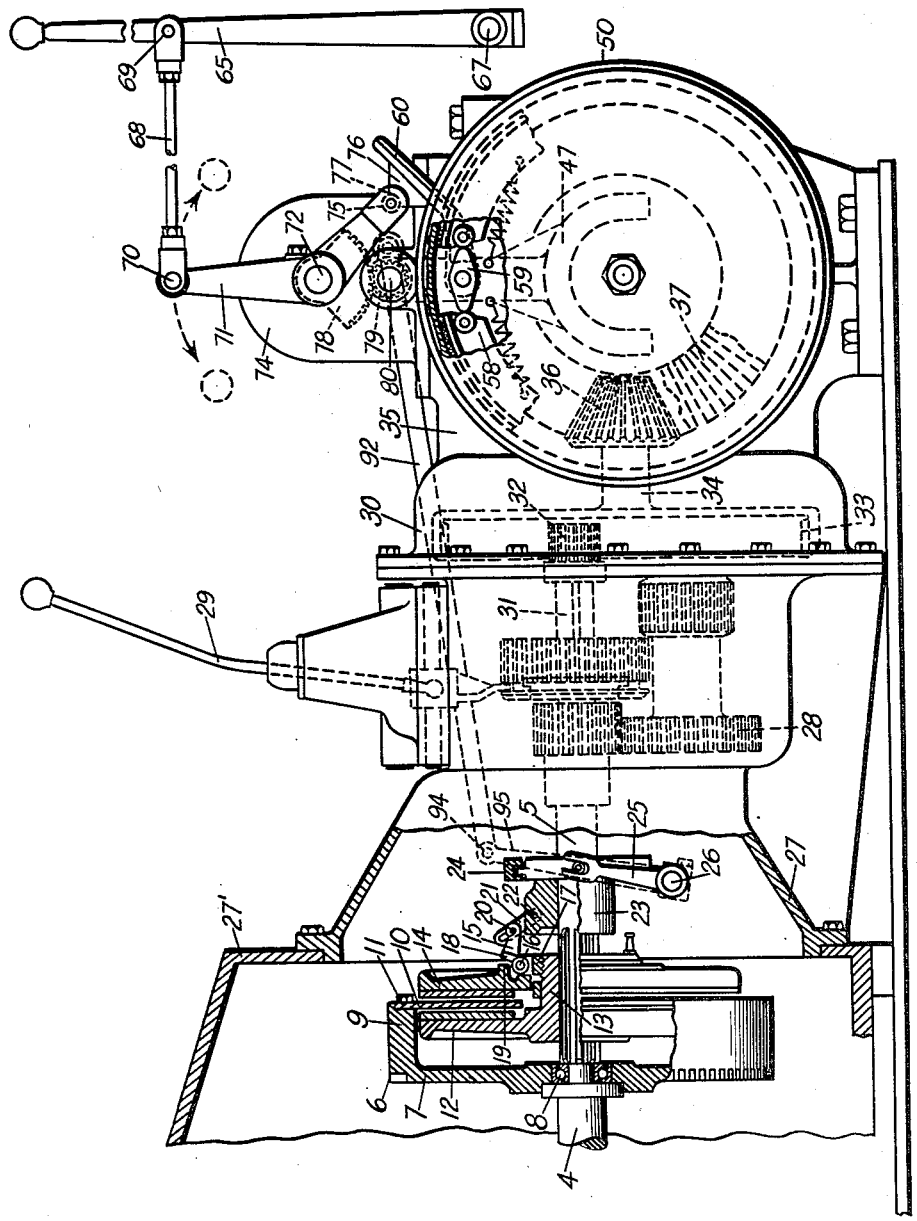
Figure 2 is a view partly in vertical section and partly in side elevation of the transmission assembly shown in Figure 1.

The end of the shaft opposite to that which drives the mixing drum has a brake unit indicated generally by the numeral 50 associated therewith. This brake unit, as indicated, is not mounted directly on the shaft 38. The brake drum 51 of the brake unit is keyed onto a short shaft 52 disposed in alignment with the shaft 38. This shaft 52 is rotatably carried by a ball bearing 53 in an extension 54 of the housing 35. The inner end of the shaft fits into a socket 55 formed in the adjacent end of shaft 38 and roller bearings 56 are provided to reduce friction at this point. Thus, the shaft 38 and the shaft 52 are free to rotate relative to each other. The brake unit 50 is preferably of the automotive type. A plate 57 is bolted to the extension 54 of the housing and is adapted to substantially close the open side of the brake drum. A pair of brake shoes 58 are provided within the drum and are pivoted to a stationary member in the usual way, for example, to the extension 54 of the housing. As indicated in Figure 2, a rotatable cam member 59 is provided for spreading the upper end of the brake shoes in order to force the shoes into contact with the brake drum. This cam 59 is actuated by means of a lever 60 which projects upwardly from the brake member.

Figure 6:
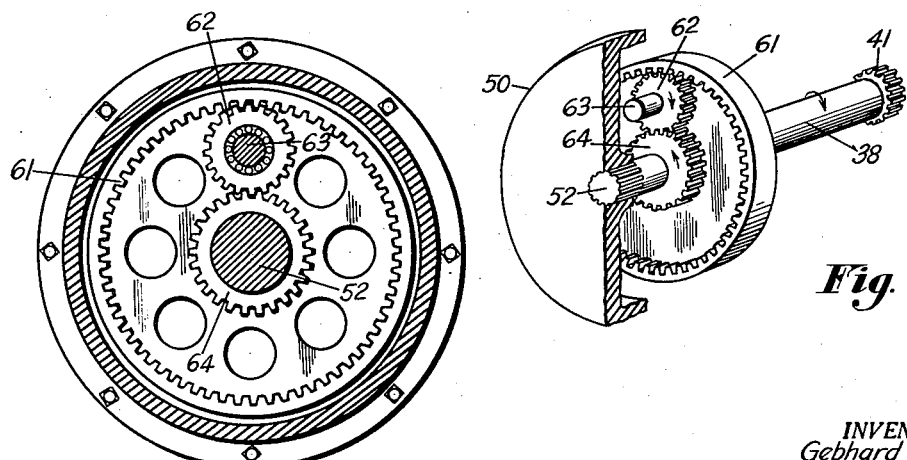
Figure 6 is a section taken substantially along line 6—6 of Figure 5.
Figure 7:
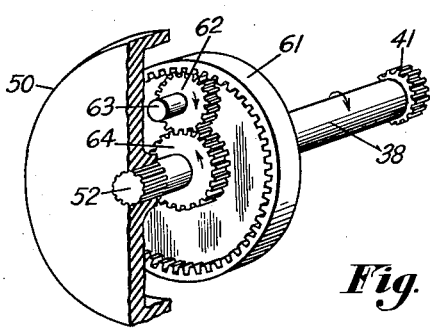
Figure 7 is a detail mainly in perspective but partly in section illustrating the gears for connecting the out-put shaft to the brake shaft.

In order to obtain maximum braking action on the shaft 38, the brake drum 51 is connected to the shaft 38 by gears so arranged that the brake drum is driven at a much higher rate of speed than the shaft 38. To accomplish this, as indicated best in Figures 5, 6 and 7, planetary gearing is provided. Thus, the end of the shaft 38 has a large internal ring gear 61 keyed thereon. This ring gear meshes with a pinion 62 which is rotatably mounted on the portion 54 of the housing, as indicated at 63. This pinion 62 meshes with a sun gear 64 which is keyed on the inner end of the short shaft 52 which also has the brake drum 51 keyed thereon. Thus, the shaft 38 will drive the shaft 52 and, consequently, the drum 51 through the medium of the planetary gearing. This will increase the speed of rotation of the brake drum 51 as compared to the speed of rotation of the shaft 38. Consequently, when the brake is applied it will result in the application of more torque to the shaft 38 than would be applied thereto if the drum 51 were mounted directly on shaft 38. By having the train of gears between the brake shaft and the out-put shaft of the transmission, a more efficient braking action is produced, and the torque capacity of the brake can be increased two or three times according to the gear ratio chosen.

We will now describe the controlling means which we provide for the transmission. As previously indicated, this controlling means is of such a nature that by merely operating a single control lever, the brake unit 50, the forward and reverse clutches 43, and the engine clutch 6 will all be operated.

The main control lever is indicated by the numeral 65 (Figure 1). This lever has its lower end pivoted to a suitable support 66 as at 67. Intermediate its upper and lower ends it is pivoted to a link 68 as at 69. The opposite end of this link 68 is pivoted as at 70 to the upper end of a bell crank lever 71. This lever 71 is keyed on the outer end of a shaft 72 which is rotatably mounted in a support 74 extending upwardly from the housing 35. The extreme lower end of this bell crank lever is bifurcated and has a roller 75 disposed therebetween. This roller 75 is adapted to engage a cam member 76 provided on the brake-operating lever 60. This cam member is of inverted V-shape. It is provided with a socket or cradle 77 (Figure 2) which receives the roller 75 when the lever 65 is in neutral position. At this time, the lever 60 is pressed downwardly so that the brake will be on. If the lever 65 is moved in either direction from neutral position, the lever 71 is rotated about pivot 72 and the roller 75 moves out of the cradle 77 and down one of the inclined edges of the cam member 76. This permits upward movement of the lever 60 and release of the brake. The cradle 77 cooperates with the roller 75 to lock the brake on whenever the lever 65 is in neutral position. Thus, there will be no danger of accidental release of the brake as long as lever 65 is in neutral position. It is necessary to positively move lever 65 in one direction or the other from neutral position in order to release the brake.

The shaft 72 carries on the end thereof opposite to that where the lever 71 is carried a gear segment 78 which is keyed thereon. This gear segment depends from the shaft 72 and meshes with a pinion 79 (Figure 4) which is formed on the end of a shaft 80 illustrated best in Figure 5. This shaft 80 is disposed within the housing 35 and is rotatably mounted in bearings 81 carried thereby. The shaft 80 is disposed directly above the shaft 38 in alignment therewith and extends substantially parallel to the shaft 38. The shaft 80 carries a sleeve member 82 which is splined thereon. A compression spring 83 is disposed between each end of member 82 and a collar 84 is disposed on the shaft 80 and abutting against a shoulder formed thereon. The sleeve 82 passes through a sleeve 85 formed on the upper end of the shifter fork 47. The member 82 is free to rotate within the member 85 and member 85 is adapted to be moved longitudinally of the member 82.

Figure 8:
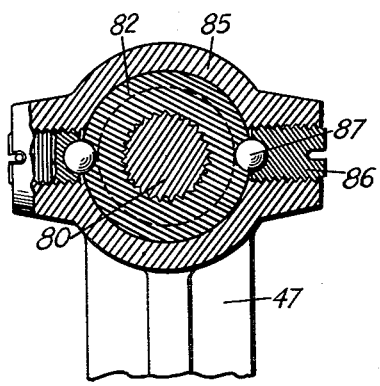
Figure 8 is a section taken substantially along line 8—8 of Figure 5 showing the upper end of the shifter fork for shifting the gear clutches and the shaft associated therewith for moving the fork.

The member 82 is connected to the portion 85 of the fork 47 in such a manner that when the shaft 80 is rotated, the portion 85 and, consequently, the shifter fork 47 will be moved longitudinally of the member 82 and shaft 80. As indicated best in Figure 8, ball socket members 86 are threaded through opposite sides of the sleeve 85 at diametrically opposed points. Each member 86 has a socket formed in its inner end which receives a ball 87. The members 86 are so adjusted that the balls 87 project inwardly past the inner surface of the sleeve member 85. These balls 87 are adapted to project into a pair of grooves 88 formed in the periphery of the member 82. Each ball 87 is adapted to cooperate with one of the grooves 88.

The member 82 in reality serves as a screw member which is connected to the member 85 in such a manner that when member 82 is rotated member 85 will be moved longitudinally thereof. Each of the grooves 88 passes around the member 82 in a substantially helical path. The path each of the grooves follows is illustrated in the diagrammatic view of Figure 9 which is a flat lay-out of the surface of the sleeve member 82. It will be noted in this view that while the main portion 89 of each groove extends helically around member 82 each end portion 90 of the groove is straight being substantially at right angles to the longitudinal axis of member 82.

It will be apparent that with this connection between the members 82 and 85 rotation of the shaft 80, and consequently member 82, will cause the member 85 to move longitudinally thereof since the balls 87 following the helical portions 89 of the grooves in member 82 will cause member 85 to be shifted along the member 82 due to the fact that the member 82 will not move longitudinally of the shaft 80. However, when the straight portions 90 of the groove reach the balls 87, continued rotation of the shaft 80 will be permitted without further longitudinal movement of member 85.

It will be apparent that when the main control lever 65 is moved away from neutral position, the shaft 72 is rotated causing the segment 78 to impart rotating movement to the shaft 80. Rotation of the shaft 80, in turn, causes movement of member 85 longitudinally thereof and, consequently, movement of the member 47 to one side. This, in turn, will cause longitudinal movement of the collar 45 on the shaft 38 and engagement of one of the gear members 44 with the internal gear portion 46 of the adjacent gear member 37. Thus, movement of the main control lever in one direction will actuate one of the gear clutches 43 so that the shaft 38 will be rotated in one direction while movement of the main control lever in the opposite direction from neutral position will actuate the other clutch 43 so that the shaft 38 will be driven in the opposite direction. When the main control lever is in neutral position both of the clutches will be inoperative and the shaft 38 will be disconnected from the shaft 34. The springs 83 on shaft 81 are provided as cushion elements to prevent stripping of gears 44 and 46. When the member 44 is thrown into engagement with member 46, if these members do not properly mesh instantaneously, the member 82 may move slightly against the force of the spring 83 on the shaft 80 in the proper direction until the gear portion 44 and the gear portion 46 slide into proper engagement with each other. It will be noted that all of the parts for controlling movement of the shifter fork 47 are disposed within the housing where they will be protected.

The shaft 80 extends through the rear side of the housing. This shaft has a small crank arm 91 keyed on its outer end. This crank arm has its outer end pivotally connected to a rod 92 as at 93. The rod 92 extends towards the power unit 2 to a point adjacent the clutch 6 where it is pivotally connected as at 94 (Figure 1) to the upper end of a lever 95. This lever 95 has its lower end keyed to the shaft 26 as at 96. As previously indicated, shaft 26 carries the yoke member 25 which controls actuation of the clutch 6. The crank arm 91 connects the shaft 80 to the rod 92 in such a manner that whenever the control lever 65 is moved away from neutral position in either direction, the clutch 6 will be engaged. To accomplish this, when the control lever 65 is in neutral position the crank arm 91 extends rearwardly from the shaft 80 and the axis of the pivot pin 93 is in substantially the same horizontal plane as the axis of the shaft 80. When the control lever is moved away from neutral position in one direction, for example, to the right with reference to Figure 2, the shaft 80 will be rotated in such a manner as to swing the outer end of the crank arm 91 and, consequently, the pivot point 93 downwardly and forwardly towards the power unit 2, moving the rod 92 towards the power unit and engaging clutch 6. On the other hand, when the control lever 65 is moved to the left away from neutral position, the outer end of the crank arm 91 and, consequently, pivot point 93 will be swung upwardly and forwardly moving the rod 92 towards the power unit 2 and engaging clutch 6. Thus, movement of the control lever 65 in either direction from neutral position moves rod 92 in the proper direction to engage clutch 6.

It will be apparent that this controlling means has many advantages. Movement of a single control lever 65 actuates the brake 50, the forward and reverse clutches 43, and the engine clutch 6. When the control lever is in neutral position, the brake will be on, the forward and reverse clutches will both be out of engagement so as to interrupt the drive between the in-put shaft 5 and the out-put shaft 38, and the engine clutch will be out of engagement to interrupt the drive between the drive shaft 4 of the engine and the in-put shaft 5 of the transmission. Moving the control lever in one direction from neutral will cause the brake to be released, one of the gear clutches 43 to be engaged to drive the out-put shaft in one direction and the engine clutch to be engaged to connect the engine shaft to the in-put shaft of the transmission. On the other hand, movement of the control lever in the opposite direction from neutral position will cause the brake to be released, the other gear clutch 43 to be engaged to drive the out-put shaft in the reverse direction and the engine clutch to be engaged to connect the engine shaft to the in-put shaft of the transmission. Thus, it is necessary for an operator merely to move a single control lever in one direction to operate the various units to cause the mixing drum to be driven in one direction and to move the control lever back to neutral position to stop the drum. If he moves the control lever away from neutral position in the opposite direction, this will cause movement of the drum in a reverse direction while movement back to neutral position again will stop rotation of the drum.

Only slight movements of the control lever are required to actuate the various units. Movement of the control lever 65 through a short distance to cause slight rotation of shaft 72 will produce much greater rotation of the shaft 80 due to the provision of the segment 78. It will be apparent that most of the parts of the control mechanism are enclosed within the housing so that they will be completely protected. Furthermore, most of the motions of the control mechanism are rotary motions in order to reduce friction to a minimum.

Figure 9:
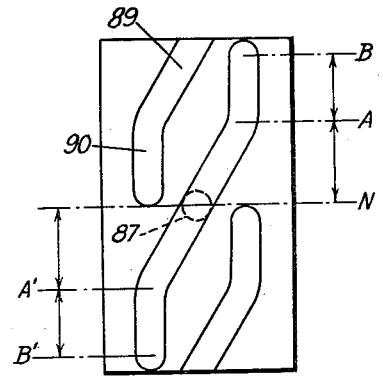
Figure 9 is a diagrammatic view illustrating the shape of the grooves which are provided in the shaft illustrated in Figure 8.

The controlling means is of such a nature that when the lever 65 is moved away from neutral position, the brake is first released, then one of the clutches 43 is engaged and finally the clutch 6 is engaged. It is necessary to insure that the clutch 6 will be the last to be engaged. This is one of the reasons for providing the straight portions 90 in the grooves 88. Referring to Figure 9, one of the balls 87 is indicated in the position in the groove 88 which it will occupy when the lever 65 is in neutral position. This point is indicated by the line N. If the main control lever is moved in one direction away from neutral position, the ball will travel in the helical portion of the groove to the point indicated by the line A. During the travel from the point N to the point A, the brake will be disengaged by the connections to the lever 65 and one of the clutches 43 will be engaged. However, the engine clutch 6 will not yet be engaged. Continued movement of lever 65 causing continued rotation of shaft 80 will move the ball 87 through the straight portion 90 of the groove from the point A to the point indicated by the line B. During this continued movement through the straight portion 90 of the groove, the continued rotation of the shaft 80 will cause the clutch 6 to be engaged. Thus, the straight portions 90 of the grooves permit continued rotation of the shaft 80 after one of the clutches 43 is engaged, in order to permit the clutch 6 to be engaged after engagement of the clutch 43. Due to pin and slot connection 20, limited movement of rod 92 is permitted before clutch 6 is engaged. The straight portions 90 of the grooves also serve to lock the clutches 43 in engagement since they will prevent longitudinal movement of the fork 47 relative to member 82 after the balls are in the straight portions of the grooves. If the control lever is moved in the opposite direction from neutral position, the ball 87 will move to the point A' through the helical groove and then to the point B' through the straight portion of the groove, resulting in an action similar to that occurring in the movement from the point N to the point B.

Figure 10:
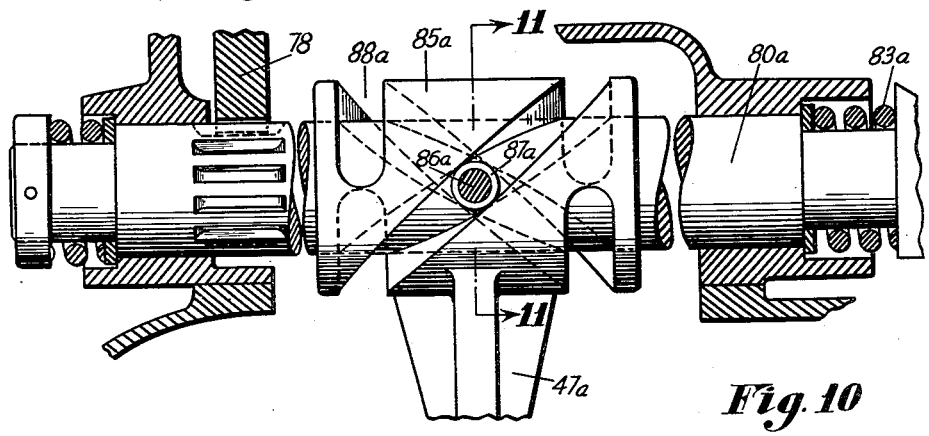
Figure 10 is a view partly in section and partly in side elevation showing slightly different means for moving the shifter fork.
Figure 11:
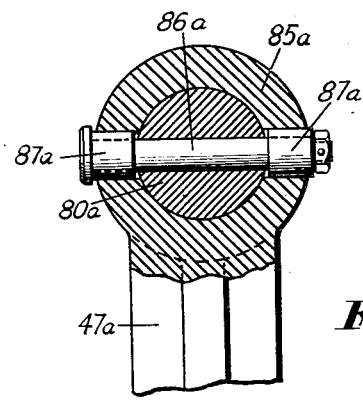
Figure 11 is a section taken substantially along line 11—11 of Figure 10.

In Figures 10 and 11, we illustrate slightly different means for shifting the fork in order to actuate the clutches 43. In this instance, the shaft 80a is mounted in suitable bearings for slight longitudinal movement restrained by the cushioning spring 83a. The shifter fork 47a has a sleeve 85a formed on its upper end through which the shaft 80a passes. In this instance, the grooves 88a are formed in the sleeve portion 85a. As indicated in Figure 11, the shaft 80a is provided with a transversely extending pin 86a which projects from opposite sides thereof and carries rollers 87a. Each of these rollers cooperates with one of the grooves 88a.

It will be apparent that when the shaft 80a is rotated by means of the segment 78, the rollers 87a will cooperate with the grooves 88a to move the sleeve portion 85a longitudinally of shaft 80a and consequently move the shifter fork 47a longitudinally of shaft 80a to engage either of the clutches 43. Slight longitudinal movement of the shaft 80a together with the fork 47a will be permitted by the springs 83a in case the members of the clutch are not in exact meshing relationship.

Thus, with both this device for shifting the fork that controls the forward and reversing clutches, the shifter fork will be moved easily and efficiently. Due to the provision of the balls 87 and the rollers 87a, there will be rolling friction between the parts rather than sliding friction which will insure ease of operation.

It will be apparent that the transmission which we have provided is of a very simple and compact structure and is of very rugged construction. The brake is so associated with the transmission that each time the drive between the in-put shaft and the out-put shaft of the transmission is interrupted, the brake will automatically be effective to prevent rotation of the out-put shaft. The brake is mounted on a shaft independent of the out-put shaft but is connected to the out-put shaft by gearing which produces a more effective braking action on the out-put shaft than if the brake were mounted directly on the out-put shaft. The controlling means for the engine clutch, forward and reverse clutches, and the brake are all under the control of a single control lever. The controlling means for the various units are simple and composed of a small number of parts being free of excessive friction to insure ease of operation and being of such a nature that the parts will not bind. The multi-speed unit is so arranged as to permit selection and shifting of gears without any difficulty. This means may be set for a certain speed and the other units of the device may be actuated without changing the setting of this unit.

Various other objects and advantages will be apparent from the preceding description, the drawings and the following claims.

Having thus described our invention, what we claim is:

1. A device for transmitting power from a power unit to a driven unit comprising an in-put shaft and an out-put shaft, means for selectively connecting and disconnecting the shafts, a brake unit for applying a braking force to the out-put shaft whenever the in-put shaft and the out-put shaft are disconnected, said brake unit embodying a brake drum mounted on a shaft independent of the out-put shaft, means for connecting said out-put shaft and the brake shaft in such a manner that the brake shaft will be driven by the out-put shaft at a greater rate of speed than the out-put shaft, said means comprising gearing connecting the out-put shaft to the brake shaft in such a manner that increased torque will be applied to the out-put shaft by the brake unit, and means for applying the brake whenever the in-put shaft and the out-put shaft are disconnected from each other and for releasing the brake whenever they are connected to each other, said means being under the control of a single control lever.

2. A device for transmitting power from a power unit to a driven unit comprising an in-put shaft and an out-put shaft, a clutch for selectively connecting or disconnecting the in-put shaft and the power unit, means for selectively connecting and disconnecting the in-put shaft and the out-put shaft, a brake unit for applying a braking force to the out-put shaft, said brake unit embodying a brake drum mounted independently of the out-put shaft, gearing connecting said out-put shaft to said brake drum so that the brake drum will be driven by the out-put shaft, and means for actuating said brake unit, said means for selectively connecting and disconnecting the in-put shaft and the out-put shaft and said clutch, all of sad actuating means being under the control of a single control lever.

3. A device for transmitting power from a power unit to a driven unit comprising an in-put shaft and an out-put shaft, a clutch for selectively connecting or disconnecting the in-put shaft and the power unit, means for selectively connecting or disconnecting the in-put shaft and the out-put shaft, a brake unit for applying a braking force to the out-put shaft, said brake unit being associated with a shaft independent of the out-put shaft but which is continuously connected to the out-put shaft, and means for actuating said brake unit, said means for selectively connecting and disconnecting the in-put shaft and the out-put shaft and said clutch, all of said actuating means being under the control of a single control lever.

4. A device for transmitting power from a power unit to a driven unit comprising an in-put shaft and an out-put shaft, a clutch for selectively connecting or disconnecting the in-put shaft and the power unit, a pair of clutches for selectively connecting or disconnecting the in-put shaft and the out-put shaft, engagement of one of said last-named clutches being adapted to drive the out-put shaft in one direction and engagement of the other of said clutches being adapted to drive the out-put shaft in the opposite direction, a brake unit for applying a braking force to the out-put shaft, said brake unit being associated with a shaft independent of the out-put shaft but which is continuously connected to the out-put shaft by gearing, and means for actuating said first clutch, said pair of clutches and said brake unit, all of said actuating means being under the control of a single control lever.

5. A device for transmitting power from a power unit to a driven unit comprising an in-put shaft and an out-put shaft, a clutch for selectively connecting or disconnecting the in-put shaft and the power unit, a pair of clutches for selectively connecting or disconnecting the in-put shaft and the out-put shaft, engagement of one of said last-named clutches being adapted to drive the out-put shaft in one direction and engagement of the other of said clutches being adapted to drive the out-put shaft in the opposite direction, a brake unit for applying a braking force to the out-put shaft, said brake unit being associated with a shaft independent of the out-put shaft but which is continuously connected to the out-put shaft by gearing, and means for actuating said first clutch, said pair of clutches and said brake unit, all of said actuating means being under the control of a single control lever, said control lever being connected to said actuating means in such a manner that when said lever is in neutral position all of said clutches will be out of engagement and the brake will be on, movement of said control lever away from neutral position in one direction causing release of the brake, engagement of one of said pair of clutches and engagement of the first-named clutch, and movement of said control lever in the opposite direction away from neutral position causing release of the brake, engagement of the other of said pair of clutches and engagement of the first-named clutch.

6. A device of the type described comprising a power unit, means for transmitting power from said power unit to a member to be driven, said means comprising an in-put shaft and an out-put shaft, a clutch for selectively connecting or disconnecting the power unit and the in-put shaft, a pair of clutches for selectively connecting or disconnecting the in-put shaft and the out-put shaft, engagement of one of said pair of clutches being adapted to drive the out-put shaft in one direction and engagement of the other of said clutches being adapted to drive the out-put shaft in the opposite direction, a brake unit for applying a braking force to the out-put shaft, a single control lever for actuating all of said clutches and said brake unit, means for connecting said control lever to all of said clutches and said brake unit, said means including a brake-actuating lever keyed to a rotatably mounted shaft and connected to said control lever, a second rotatably mounted shaft disposed in spaced relationship to the first shaft, a gear segment carried by said first shaft and adapted to engage a gear portion on the second shaft so that rotation of the first shaft will impart rotation to the second shaft, a clutch-actuating member for operating either of said pair of clutches, said member having a sleeve portion disposed in surrounding relationship to the second shaft, said sleeve portion and said shaft having interfitting portions including helical grooves so that rotation of said shaft will move said member longitudinally thereof in either direction depending upon the direction of rotation of the shaft in order to engage either of said pair of clutches, a crank arm carried by said second shaft, said crank arm being connected to the first-named clutch in such a manner that rotation of said shaft in either direction will operate said clutch.

7. A device of the type described comprising a power unit, means for transmitting power from said power unit to a member to be driven, said means comprising an in-put shaft and an out-put shaft, a clutch for selectively connecting or disconnecting the power unit and the in-put shaft, a pair of clutches for selectively connecting or disconnecting the in-put shaft and the out-put shaft, engagement of one of said pair of clutches being adapted to drive the out-put shaft in one direction and engagement of the other of said clutches being adapted to drive the out-put shaft in the opposite direction, a single control lever for actuating all of said clutches, means for connecting said control lever to all of said clutches, said means including a shaft adapted to be rotated by movement of said control lever to which it is connected, a second rotatably mounted shaft disposed in spaced relationship to the first shaft, a gear segment carried by said first shaft and adapted to engage a gear portion on the second shaft so that rotation of the first shaft will impart rotation to the second shaft, a clutch-actuating member for operating either of said pair of clutches, said member having a sleeve portion disposed in surrounding relationship to the second shaft, said sleeve portion and said shaft having interfitting portions including helical grooves so that rotation of said shaft will move said member longitudinally thereof in either direction depending upon the direction of rotation of the shaft in order to engage either of said pair of clutches, a crank arm carried by said second shaft, said crank arm being connected to the first-named clutch in such a manner that rotation of said shaft in either direction will engage said clutch.

8. A device of the type described comprising a power unit, means for transmitting power from said power unit to a member to be driven, said means comprising an in-put shaft and an out-put shaft, a clutch for selectively connecting or disconnecting the power unit and the in-put shaft, a pair of clutches for selectively connecting or disconnecting the in-put shaft and the out-put shaft, engagement of one of said pair of clutches being adapted to drive the out-put shaft in one direction and engagement of the other of said clutches being adapted to drive the out-put shaft in the opposite direction, a single control lever for actuating all of said clutches, means for connecting said control lever to all of said clutches, said means including a shaft rotatably mounted and connected to said control lever in such a manner that movement of the control lever will rotate the shaft, a clutch-actuating member for operating either of said pair of clutches, means for connecting said clutch-actuating member to said shaft in such a manner that rotation of said shaft will move said member longitudinally thereof in either direction depending upon the direction of rotation of the shaft in order to engage either of said pair of clutches, and means for connecting said shaft to said first-named clutch in such a manner that rotation of said shaft in either direction will engage said clutch.

9. A device of the type described comprising a power unit, means for transmitting power from said power unit to a member to be driven, said means comprising an in-put shaft and an out-put shaft, a clutch for selectively connecting or disconnecting the power unit and the in-put shaft, means for selectively connecting or disconnecting the in-put shaft and the out-put shaft, a single control lever for actuating said last-named means and said clutch, means for connecting said control lever to said clutch and said means for connecting or disconnecting said shafts, said means including a shaft rotatably mounted and connected to said control lever in such a manner that movement of the control lever will rotate the shaft, a member for actuating said means for connecting or disconnecting the in-put shaft and the out-put shaft, said member being associated with said shaft which is connected to the control lever in such a manner that rotation of said shaft in either direction will move said member longitudinally of the shaft in either direction depending upon the direction of rotation of the shaft in order to operate said means for connecting or disconnecting the in-put shaft and the out-put shaft, and means for connecting said shaft which is connected to the control lever to said clutch in such a manner that rotation of said shaft in either direction will engage said clutch.

10. A device of the type described comprising a power unit, means for transmitting power from said power unit to a member to be driven, said means comprising an in-put shaft and an out-put shaft, a clutch for selectively connecting or disconnecting the power unit and the in-put shaft, a pair of clutches for selectively connecting or disconnecting the in-put shaft and the out-put shaft, engagement of one of said pair of clutches being adapted to drive the out-put shaft in one direction and engagement of the other of said clutches being adapted to drive the out-put shaft in the opposite direction, a single control lever for actuating all of said clutches, means for connecting said control lever to all of said clutches, said means including a shaft rotatably mounted and connected to said control lever in such a manner that movement of the control lever will rotate the shaft, a clutch-actuating member for operating either of said pair of clutches, said clutch-actuating member carrying a sleeve disposed in surrounding relationship to said shaft, interfitting portions between said shaft and said sleeve including helical grooves so disposed that rotation of said shaft will move said member longitudinally thereof in either direction depending upon the direction of rotation of the shaft in order to engage either of said pair of clutches, means for connecting said shaft to said first-named clutch in such a manner that rotation of said shaft in either direction will engage said clutch, said grooves having portions disposed substantially at right angles to the axis of the shaft in order to permit continued rotation of said shaft after either of said pair of clutches is engaged without further longitudinal movement of said member in order to subsequently engage said first-named clutch.

GEBHARD JAEGER.
CHRIS GERST.